Figure 1:
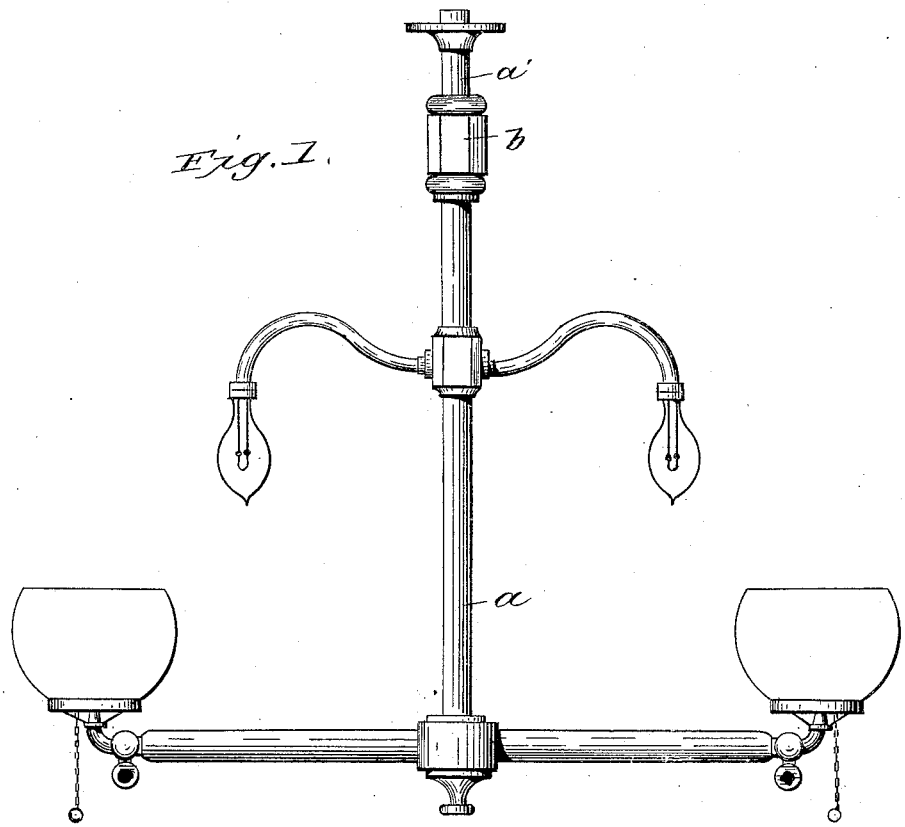

(No Model.)

E. E. ERICKSON.
INSULATING COUPLING FOR PIPES.

No. 408,600. Patented Aug. 6, 1889.

Witnesses
E. L. Smith
A. V. Cushman

Inventor:
E. E. Erickson
By his Attorneys
Clarke & Raymond
per Henry Calver
Asso. Atty.

UNITED STATES PATENT OFFICE.

ERICK E. ERICKSON, OF BOSTON, MASSACHUSETTS, ASSIGNOR OF ONE-HALF TO WINTHROP THAYER, OF SAME PLACE.

INSULATING-COUPLING FOR PIPES.

SPECIFICATION forming part of Letters Patent No. 408,600, dated August 6, 1889.

Application filed March 5, 1889. Serial No. 301,982. (No model.)

*To all whom it may concern:*

Be it known that I, ERICK E. ERICKSON, of Boston, in the county of Suffolk and State of Massachusetts, a citizen of the United States, have invented a new and useful Improvement in Insulating-Couplings for Pipes and other Purposes, of which the following is a full, clear, and exact description, reference being had to the accompanying drawings, forming a part of this specification, in explaining its nature.

The object of the invention is to provide a cheap insulating-coupling for connecting pipe-sections.

I have illustrated the invention in the drawings as applied to the vertical pipe of a gas-chandelier, which is also used for supporting the brackets or arms carrying incandescent lights, and in the drawings—

Figure 2:
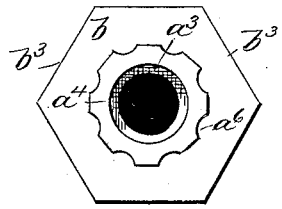
Figure 3:
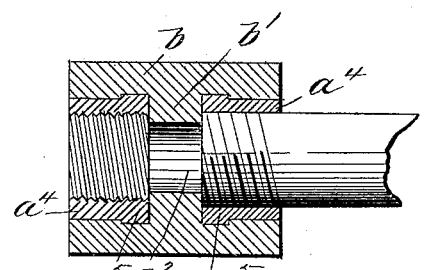
Figure 4:
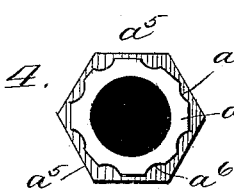
Figure 5:
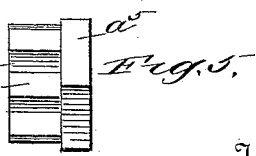

Figure 1 is a view in elevation of a chandelier of this character. Fig. 2 is a view in end elevation of the coupling. Fig. 3 is a view in longitudinal section; and Figs. 4 and 5 are detail views of parts to which reference is hereinafter made.

Referring to the drawings, $a$ represents one section of a pipe, $a'$ another section, and $b$ the insulating-coupling connecting the two pipes. The coupling comprises the two sleeves $a^4$, of any suitable metal, and which are open at their inner ends, one of which preferably has a right interior screw-thread and the other a left interior screw-thread, although this, of course, is not essential. Each of the sleeves preferably has a flange or extension $a^5$ preferably from its inner end, and which preferably is polygonal in form upon its edges. (See Figs. 4 and 5.) The remainder of the barrel of each sleeve from the shoulder to the outer end is preferably provided with longitudinal recesses or flutings $a^6$. (See Figs. 2, 4, and 5.) These two sleeves thus formed are united or connected to each other by a plastic or formative insulating composition in molds, preferably under considerable pressure, and this section or part of the coupling-nut surrounds or incloses the sleeves, extends between the ends thereof, and has its surface formed with wrench or turning faces.

In the drawings, $b$ represents the molded insulating connecting piece or section of the coupling.

$b'$ is the portion thereof which extends between the inner ends of the screw-sleeves. $b^2$ is the hole formed therein in continuity of the holes in the sleeves and the pipes which they connect.

$b^3$ represents the wrench or polygonal faces formed thereon. Preferably this formative connecting-section of insulating material extends to the end of each sleeve, and by pressure it is forced into the flutings of the sleeves and about the shoulders thereof, so that the sleeves are rigidly secured or held in place and cannot be independently turned.

Of course, in lieu of forming the exterior of the sleeves with shoulders and flutings, as above specified, they may have any other shape which will insure their being held by the connecting material in a manner to prevent turning and insure a tight joint.

I do not limit myself to the nature of the insulating composition, as any insulating composition which is of a formative or plastic nature and is capable of being compressed and shaped in molds, either with or without heat, may be employed. I prefer to use, however, a composition embracing the following ingredients: Mica, in a comminuted state, intimately incorporated with heated shellac.

It will be seen that a coupling of this character provides a tight joint or connection, and is of simple construction and is cheaply made.

In use it is screwed upon the threaded end of a pipe, and the threaded end of the pipe of the chandelier or other pipe is then screwed into it; or, if the sleeves are right and left threaded, then the ends of the pipes to be connected are placed in proper position in relation to the coupling and the coupling turned to secure them together.

Having thus fully described my invention, I claim and desire to secure by Letters Patent of the United States—

1. An insulating pipe-coupling consisting of two internally-threaded metallic sleeves $a^4$, and a connecting-piece $b$, of hardened plastic insulating material, in which said metallic sleeves are embedded separated from each other, said insulating connecting-piece having a hole $b^2$ between said sleeves.

2. An insulating pipe-coupling consisting of two internally-threaded metallic sleeves $a^4$ and a connecting-piece $b$, of hardened plastic insulating material, in which said metallic sleeves are embedded separated from each other, said insulating connecting-piece having the hole $b^2$ between said metallic sleeves and a polygonal exterior, substantially as set forth.

3. The insulating-coupling herein described, comprising the metal sleeves $a^4$, having shoulders $a^5$ and longitudinal recesses $a^6$, with the compressed insulating-connection $b$ of formative material, having the interposed section $b'$, and surrounding and firmly united to the said sleeves $a^4$, substantially as described.

ERICK E. ERICKSON.

Witnesses:
F. F. RAYMOND, 2d,
A. B. MERRILL.